US012803002B2

(12) United States Patent
Li et al.

(10) Patent No.: US 12,803,002 B2
(45) Date of Patent: Nov. 17, 2026

(54) SECONDARY BATTERY

(71) Applicants: TOYOTA JIDOSHA KABUSHIKI KAISHA, Toyota (JP); UNIVERSITY OF TSUKUBA, Tsukuba (JP)

(72) Inventors: Ximeng Li, Susono (JP); Takahiro Kondo, Tsukuba (JP)

(73) Assignees: TOYOTA JIDOSHA KABUSHIKI KAISHA, Toyota (JP); UNIVERSITY OF TSUKUBA, Tsukuba (JP)

( * ) Notice: Subject to any disclaimer, the term of this patent is extended or adjusted under 35 U.S.C. 154(b) by 548 days.

(21) Appl. No.: 18/462,063

(22) Filed: Sep. 6, 2023

(65) Prior Publication Data

US 2024/0088394 A1 Mar. 14, 2024

(30) Foreign Application Priority Data

Sep. 12, 2022 (JP) ................................ 2022-144702

(51) Int. Cl.

*H01M 4/62* (2006.01)
*H01M 4/02* (2006.01)
*H01M 4/66* (2006.01)
*H01M 10/052* (2010.01)
*H01M 10/0562* (2010.01)

(52) U.S. Cl.

CPC .......... *H01M 4/628* (2013.01); *H01M 4/669* (2013.01); *H01M 10/0562* (2013.01); *H01M 2004/027* (2013.01); *H01M 10/052* (2013.01); *H01M 2300/0068* (2013.01)

(58) Field of Classification Search

CPC ................................................ H01M 4/62

See application file for complete search history.

(56) References Cited

U.S. PATENT DOCUMENTS

2019/0051933 A1 2/2019 Li et al.
2019/0315628 A1* 10/2019 Kondo ................. C01B 35/026
2022/0359871 A1 11/2022 Matsubara et al.

FOREIGN PATENT DOCUMENTS

CN 112117437 A 12/2020
JP 2019036537 A * 3/2019 ........... H01M 10/42
JP 2022-010554 A 1/2022
WO 2020/262102 A1 12/2020

* cited by examiner

*Primary Examiner* — Stephan J Essex
(74) *Attorney, Agent, or Firm* — Sughrue Mion, PLLC

(57) ABSTRACT

A secondary battery of the present disclosure includes a positive electrode, an electrolyte layer, a negative electrode current collector, and metallic lithium as a negative electrode active material that is deposited between the electrolyte layer and the negative electrode current collector by charging, an intermediate layer is present between the electrolyte layer and the negative electrode current collector, and the intermediate layer contains hydrogen boride.

6 Claims, 2 Drawing Sheets

SECONDARY BATTERY

CROSS-REFERENCE TO RELATED APPLICATION

This application claims priority to Japanese Patent Application No. 2022-144702 filed on Sep. 12, 2022, incorporated herein by reference in its entirety.

BACKGROUND

1. Technical Field

The present disclosure discloses a secondary battery.

2. Description of Related Art

Japanese Unexamined Patent Application Publication No. 2019-036537 (JP 2019-036537 A) discloses a lithium solid battery including a positive electrode, a solid electrolyte layer, a negative electrode current collector, and metallic lithium as a negative electrode active material that is deposited between the solid electrolyte layer and the negative electrode current collector by charging, and including a Li-occluding layer between the solid electrolyte layer and the negative electrode current collector. In addition, as a Li-occluding material contained in the Li-occluding layer, a carbon material is disclosed. Japanese Unexamined Patent Application Publication No. 2022-010554 (JP 2022-010554 A) discloses a solid battery including a positive electrode, a solid electrolyte layer, a negative electrode current collector, and metallic lithium as a negative electrode active material that is deposited between the solid electrolyte layer and the negative electrode current collector by charging, and including a protective layer between the solid electrolyte layer and the negative electrode current collector. In addition, as a material contained in the protective layer, $Li_2O$, $LiNbO_3$ and $Li_3PO_4$ are disclosed. Chinese Unexamined Patent Application Publication No. 112117437 discloses a lithium metal composite electrode including a current collector layer, a core forming layer and a metallic lithium layer in that order, or including a current collector layer, a metallic lithium layer and a core forming layer in that order. In addition, graphene, boron nitride, molybdenum oxide and the like are disclosed as the material constituting the core forming layer.

SUMMARY

In a secondary battery including a deposition type metallic lithium negative electrode, during charging, metallic lithium is likely to be non-uniformly deposited between an electrolyte layer and a negative electrode current collector, and the Coulomb efficiency during charging and discharging is likely to decrease. There is a need for a new technology capable of increasing the Coulomb efficiency for a secondary battery including a deposition type metallic lithium negative electrode.

As means for addressing the above problem, the present disclosure discloses the following plurality of aspects.

<Aspect 1>

A secondary battery including a positive electrode, an electrolyte layer, a negative electrode current collector, and metallic lithium as a negative electrode active material that is deposited between the electrolyte layer and the negative electrode current collector by charging, wherein an intermediate layer is present between the electrolyte layer and the negative electrode current collector, and wherein the intermediate layer contains hydrogen boride (HB).

<Aspect 2>

The secondary battery according to Aspect 1, wherein the intermediate layer contains hydrogen boride (HB), a solid electrolyte and carbon.

<Aspect 3>

The secondary battery according to Aspect 2, wherein the solid electrolyte is a sulfide solid electrolyte.

<Aspect 4>

The secondary battery according to any one of Aspects 1 to 3, wherein the intermediate layer covers the surface of the negative electrode current collector.

<Aspect 5>

The secondary battery according to any one of Aspects 1 to 4, wherein the electrolyte layer contains a sulfide solid electrolyte.

<Aspect 6>

The secondary battery according to any one of Aspects 1 to 5, wherein the negative electrode current collector contains stainless steel.

The secondary battery of the present disclosure includes a deposition type metallic lithium negative electrode and has high Coulomb efficiency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Secondary Battery

Figure 1:
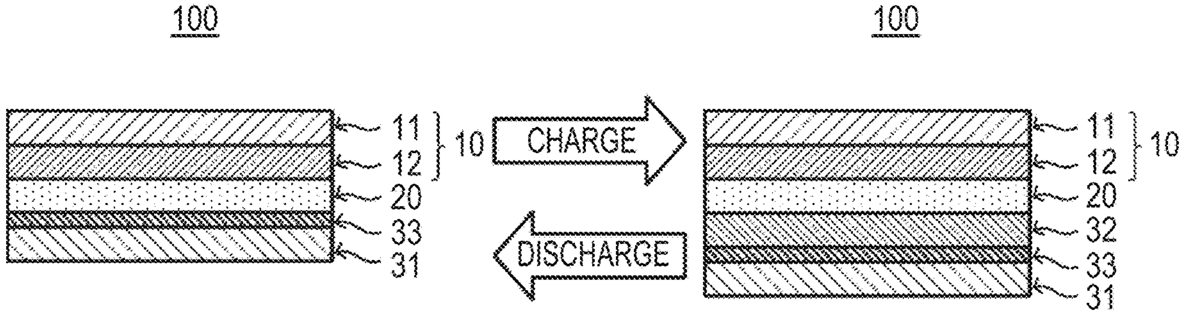
FIG. 1 schematically shows each configuration of a secondary battery 100 after charging and after discharging.

Hereinafter, a secondary battery according to an embodiment will be described with reference to the drawings, but the technology of the present disclosure is not limited to the following embodiment. FIG. 1 shows a configuration of a secondary battery 100 according to one embodiment. As shown in FIG. 1, the secondary battery 100 includes a positive electrode 10, an electrolyte layer 20, a negative electrode current collector 31, and metallic lithium 32 as a negative electrode active material that is deposited between the electrolyte layer 20 and the negative electrode current collector 31 by charging. An intermediate layer 33 is present between the electrolyte layer 20 and the negative electrode current collector 31. The intermediate layer 33 contains hydrogen boride (HB).

1.1 Positive Electrode

The positive electrode 10 contains at least a positive electrode active material. When the secondary battery 100 is charged, lithium ions released from the positive electrode active material reach between the electrolyte layer 20 and the negative electrode current collector 31 via the electrolyte layer 20, receive electrons, and are deposited as the metallic lithium 32. In addition, when the battery is discharged, the metallic lithium 32 between the electrolyte layer 20 and the negative electrode current collector 31 is dissolved (ionized) and returns to the positive electrode 10. The form of the positive electrode 10 may be any form known for the positive electrode of a secondary battery. For example, as shown in FIG. 1, the positive electrode 10 may include a positive electrode current collector 11 and a positive electrode active material layer 12.

1.1.1 Positive Electrode Current Collector

As the positive electrode current collector 11, any collector that can function as a positive electrode current collector of secondary batteries can be used. The positive electrode current collector 11 may be a metal foil or metal mesh. Particularly, metal foils have excellent handling properties and the like. The positive electrode current collector 11 may be formed of a plurality of metal foils. Examples of metals constituting the positive electrode current collector 11 include Cu, Ni, Cr, Au, Pt, Ag, Al, Fe, Ti, Zn, Co, and stainless steel. Particularly, in order to secure oxidation resistance, the positive electrode current collector 11 may contain Al. The positive electrode current collector 11 may have some coat layers on the surface thereof in order to adjust the resistance or the like. In addition, when the positive electrode current collector 11 is formed of a plurality of metal foils, some layers may be provided between the plurality of metal foils. The thickness of the positive electrode current collector 11 is not particularly limited. For example, it may be 0.1 μm or more or 1 μm or more, and may be 1 mm or less or 100 μm or less.

1.1.2 Positive Electrode Active Material Layer

The positive electrode active material layer 12 contains a positive electrode active material, and may further optionally contain an electrolyte, a conductive aid, a binder and the like. In addition, the positive electrode active material layer 12 may contain various additives. The contents of the positive electrode active material, the electrolyte, the conductive aid and the binder in the positive electrode active material layer 12 may be appropriately determined according to desired battery performance. For example, based on 100 mass % of the entire positive electrode active material layer 12 (total solid content), the content of the positive electrode active material may be 40 mass % or more, 50 mass % or more or 60 mass % or more, and may be 100 mass % or less or 90 mass % or less. The shape of the positive electrode active material layer 12 is not particularly limited, and may be, for example, a sheet form having a substantially flat surface. The thickness of the positive electrode active material layer 12 is not particularly limited, and may be, for example, 0.1 μm or more, 1 μm or more, 10 μm or more or 30 μm or more, and may be 2 mm or less, 1 mm or less, 500 μm or less or 100 μm or less.

As the positive electrode active material, one known as a positive electrode active material for secondary batteries that can supply lithium to the negative electrode during charging may be used. For example, various lithium-containing oxides such as lithium cobaltate, lithium nickelate, $LiNi_{1/3}Co_{1/3}Mn_{1/3}O_2$, lithium manganate, and spinel type lithium compounds can be used as the positive electrode active material. Alternatively, as the positive electrode active material, a material obtained by occluding lithium in sulfur can be used. The positive electrode active materials may be used alone or two or more thereof may be used in combination. The positive electrode active material may be, for example, in the form of particles, and the size thereof is not particularly limited. The positive electrode active material particles may be solid particles, hollow particles, or particles having voids. The positive electrode active material particles may be primary particles or secondary particles in which a plurality of primary particles are aggregated. The average particle size (D50) of the positive electrode active material particles may be, for example, 1 nm or more, 5 nm or more, or 10 nm or more, and may be 500 μm or less, 100 μm or less, 50 μm or less, or 30 μm or less. Here, the average particle size D50 referred to in the present disclosure is a particle size (median size) at a cumulative value of 50% in the volume-based particle size distribution obtained by the laser diffraction/scattering method.

The surface of the positive electrode active material may be covered with a protective layer containing an ion-conducting oxide. That is, the positive electrode active material layer 12 may contain a composite including the above positive electrode active material and a protective layer provided on the surface thereof. Thereby, the reaction between the positive electrode active material and sulfide (for example, a sulfide solid electrolyte to be described below) is likely to be inhibited. Examples of ion-conducting oxides that can cover and protect the surface of the positive electrode active material include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. The coverage (area ratio) of the protective layer with respect to the surface of the positive electrode active material may be, for example, 70% or more, 80% or more, or 90% or more. The thickness of the protective layer may be, for example, 0.1 nm or more or 1 nm or more, and may be 100 nm or less or 20 nm or less.

The electrolyte that can be contained in the positive electrode active material layer 12 may be a solid electrolyte, a liquid electrolyte (electrolytic solution) or a combination thereof. Particularly, when the positive electrode active material layer 12 contains a solid electrolyte (particularly, a sulfide solid electrolyte), the technology of the present disclosure can be expected to provide an even greater effect.

As the solid electrolyte, those known as solid electrolytes for secondary batteries may be used. The solid electrolyte may be an inorganic solid electrolyte or an organic polymer electrolyte. Particularly, the inorganic solid electrolyte has excellent ion conductivity and heat resistance. Examples of inorganic solid electrolytes include oxide solid electrolytes such as lithium lanthanum zirconate, LiPON, $Li_{1+X}Al_XGe_{2-X}(PO_4)_3$, Li—SiO-based glass, and Li—Al—S—O-based glass, and sulfide solid electrolytes such as $Li_2S—P_2S_5$, $Li_2S—SiS_2$, $LiI—Li_2S—SiS_2$, $LiI—Si_2S—P_2S_5$, $Li_2S—P_2S_5—LiI—LiBr$, $LiI—Li_2S—P_2S_5$, $LiI—Li_2S—P_2O_5$, $LiI—Li_3PO_4—P_2S_5$, and $Li_2S—P_2S_5—GeS_2$. In particular, the performance of the sulfide solid electrolyte, particularly, a sulfide solid electrolyte containing at least Li, S and P as constituent elements, is high. The solid electrolyte may be amorphous or crystalline. The solid electrolyte may be, for example, in the form of particles. The solid electrolytes may be used alone or two or more thereof may be used in combination.

The electrolytic solution may contain, for example, lithium ions as carrier ions. The electrolytic solution may be, for example, a non-aqueous electrolytic solution. For example, as the electrolytic solution, a solution obtained by dissolving lithium salts at a predetermined concentration in a carbonate solvent can be used. Examples of carbonate solvents include fluoroethylene carbonate (FEC), ethylene carbonate (EC), and dimethyl carbonate (DMC). Examples of lithium salts include phosphate hexafluorides.

Examples of conductive aids that can be contained in the positive electrode active material layer 12 include carbon materials such as vapor grown carbon fibers (VGCF), acetylene black (AB), ketjen black (KB), carbon nanotubes (CNT) and carbon nanofibers (CNF); and metal materials such as nickel, aluminum, and stainless steel. The conductive aid may be, for example, in the form of particles or fibers, and the size thereof is not particularly limited. The conductive aids may be used alone or two or more thereof may be used in combination.

Examples of binders that can be contained in the positive electrode active material layer 12 include butadiene rubber (BR)-based binders, butylene rubber (IIR)-based binders, acrylate butadiene rubber (ABR)-based binders, styrene butadiene rubber (SBR)-based binders, polyvinylidene fluoride (PVdF)-based binders, polytetrafluoroethylene (PTFE)-based binders, polyimide (PI)-based binders, and polyacrylic acid-based binders. The binders may be used alone or two or more thereof may be used in combination.

1.2 Electrolyte Layer

The electrolyte layer 20 contains at least an electrolyte. The electrolyte layer 20 may contain a solid electrolyte, and may further optionally contain a binder, various additives and the like. The contents of the electrolyte, the binder and the like in the electrolyte layer 20 are not particularly limited. The electrolyte layer 20 may contain a liquid component such as an electrolytic solution or may be substantially free of an electrolytic solution. The electrolyte layer 20 may have a separator or the like for preventing the positive electrode and the negative electrode from coming into contact with each other, and an electrolytic solution may be retained in the separator. The thickness of the electrolyte layer 20 is not particularly limited, and may be, for example, 0.1 μm or more or 1 μm or more, and may be 2 mm or less or 1 mm or less.

The electrolyte contained in the electrolyte layer 20 may be appropriately selected from among those exemplified as the electrolytes that can be contained in the positive electrode active material layer described above. Particularly, when the electrolyte layer 20 contains a solid electrolyte (particularly, a sulfide solid electrolyte), the technology of the present disclosure can be expected to provide an even greater effect. In addition, the binder that can be contained in the electrolyte layer 20 may be appropriately selected from among those exemplified as the binder that can be contained in the positive electrode active material layer described above. The electrolytes and binders may be used alone or two or more thereof may be used in combination. When the secondary battery is an electrolytic solution battery, the separator for retaining the electrolytic solution may be a separator that is commonly used in secondary batteries, and for example, those made of a resin such as polyethylene (PE), polypropylene (PP), polyester and polyamide may be exemplified. The separator may have a single-layer structure or a multi-layer structure. Examples of separators having a multi-layer structure include a separator having a 2-layer structure of PE/PP and a separator having a 3-layer structure of PP/PE/PP or PE/PP/PE. The separator may be made of a non-woven fabric such as a cellulose non-woven fabric, a resin non-woven fabric, or a glass fiber non-woven fabric.

1.3 Negative Electrode Current Collector

As the negative electrode current collector 31, any collector that can function as a negative electrode current collector of secondary batteries can be used. The negative electrode current collector 31 may be a metal foil or metal mesh, or may be a carbon sheet. Particularly, metal foils have excellent handling properties and the like. The negative electrode current collector 31 may be formed of a plurality of metal foils or sheets. Examples of metals constituting the negative electrode current collector 31 include Cu, Ni, Cr, Au, Pt, Ag, Al, Fe, Ti, Zn, Co, and stainless steel. Particularly, in order to secure reduction resistance and in order to prevent it from alloying with lithium, the negative electrode current collector 31 may contain at least one metal selected from among Cu, Ni and stainless steel, and specifically, stainless steel. The negative electrode current collector 31 may have some coat layers on the surface thereof. For example, as will be described below, the intermediate layer 33 containing hydrogen boride (HB) may cover the surface of the negative electrode current collector 31. Alternatively, the negative electrode current collector 31 may have a coat layer other than the intermediate layer 33 on its surface. That is, a second intermediate layer may be provided between the intermediate layer 33 and the negative electrode current collector 31. In addition, when the negative electrode current collector 31 is formed of a plurality of metal foils, some layers may be provided between the plurality of metal foils. The thickness of the negative electrode current collector 31 is not particularly limited. For example, it may be 0.1 μm or more or 1 μm or more, and may be 1 mm or less or 100 μm or less.

1.4 Metallic Lithium as Negative Electrode Active Material

The secondary battery 100 includes a lithium deposition type negative electrode. Specifically, as shown in FIG. 1, the metallic lithium 32 as a negative electrode active material is deposited between the electrolyte layer 20 and the negative electrode current collector 31 by charging. In this case, the metallic lithium 32 may be deposited as an alloy with other metals. In addition, the metallic lithium 32 deposited between the electrolyte layer 20 and the negative electrode current collector 31 is dissolved (ionized) during discharging and returns to the positive electrode 10.

The amount of the metallic lithium 32 deposited between the electrolyte layer 20 and the negative electrode current collector 31 is not particularly limited, and may be appropriately adjusted according to desired battery performance. However, if the amount of the deposited metallic lithium 32 is too large, there is concern about pressure concentration and the like. In this regard, as a guideline for the amount of the deposited metallic lithium 32, the amount may be such that the charging capacity of the secondary battery 100 is, for example, an amount of 1 mAh/cm$^2$ or more and 5 mAh/cm$^2$ or less.

According to the findings by the inventors, a conventional secondary battery including a lithium deposition type negative electrode has a problem that, when metallic lithium is repeatedly deposited and dissolved between an electrolyte layer and a negative electrode current collector, metallic lithium is non-uniformly deposited and dissolved, and the Coulomb efficiency of the battery decreases. In this regard, in order to improve the Coulomb efficiency of the battery, it is necessary to uniformly deposit metallic lithium between the electrolyte layer and the negative electrode current collector during charging. In the secondary battery 100 of the present disclosure, when the intermediate layer 33 is disposed between the electrolyte layer 20 and the negative electrode current collector 31, the metallic lithium 32 is uniformly and easily deposited between the electrolyte layer 20 and the negative electrode current collector 31.

1.5 Intermediate Layer

Figure 2:
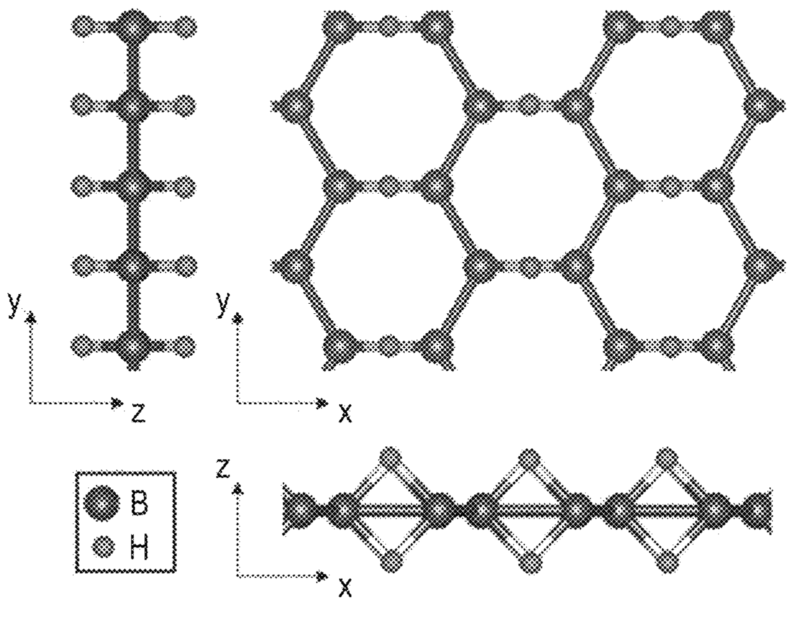
FIG. 2 shows a chemical structure of hydrogen boride (HB)

The intermediate layer 33 contains hydrogen boride (HB). HB includes H and B at a molar ratio of 1:1, and may be composed of a two-dimensional sheet framework of negatively charged boron and protons. HB is considered to have a two-dimensional structure as shown in FIG. 2 (The Crystallographic Society of Japan 64, 156-159 (2022)), and may have a microstructure in which two-dimensional structures are stacked in layers as shown in FIG. 2. HB having such a structure has a function of occluding (adsorbing) lithium during charging and releasing lithium during discharging. That is, when the secondary battery 100 is charged, lithium ions supplied between the electrolyte layer 20 and the negative electrode current collector 31 are occluded (adsorbed) by HB and are gradually deposited as the metallic lithium 32. If the metallic lithium 32 is directly deposited on the surface of the negative electrode current collector 31 without providing the intermediate layer 33, energy impact is large and the deposited metallic lithium 32 tends to grow locally and rapidly. On the other hand, when the intermediate layer 33 containing HB is present between the electrolyte layer 20 and the negative electrode current collector 31, it is considered that, during charging, some lithium ions are occluded (adsorbed) by HB and slowly deposited as the metallic lithium 32, and local growth of the metallic lithium 32 is likely to be inhibited. In addition, when the secondary battery 100 is discharged, the metallic lithium 32 between the electrolyte layer 20 and the negative electrode current collector 31 is dissolved (ionized) and returns to the positive electrode 10, and lithium occluded (adsorbed) by HB in the intermediate layer 33 is also released from HB and returns to the positive electrode 10. That is, reversible deposition and dissolution of lithium can be caused, and an irreversible capacity is unlikely to occur. As a result of these, the Coulomb efficiency of the secondary battery 100 is improved.

The intermediate layer 33 may be a layer made of only hydrogen boride (HB), or a layer containing HB and other substances. For example, the content of HB in the intermediate layer 33 may be 10 mass % or more and 100 mass % or less, and the content of substances other than HB may be 0 mass % or more and 90 mass % or less. The content of HB in the intermediate layer 33 may be 20 mass % or more, 30 mass % or more, 40 mass % or more, 50 mass % or more, 60 mass % or more, 70 mass % or more, 80 mass % or more or 90 mass % or more, and may be 90 mass % or less, 80 mass % or less, 70 mass % or less, 60 mass % or less, 50 mass % or less, 40 mass % or less, 30 mass % or less or 20 mass % or less.

When the intermediate layer 33 is a layer made of only HB, it is considered that the intermediate layer 33 has a more uniform surface property and the metallic lithium 32 can be deposited more uniformly during charging. On the other hand, it is thought that, even if the intermediate layer 33 is a layer containing a substance other than HB, the above effects (effects of slowly depositing the metallic lithium 32 while functioning as a lithium ion occlusion (adsorption) site) of HB are exhibited. Therefore, the intermediate layer 33 may contain a substance other than HB in order to exhibit some effects in addition to the above effects of HB. For example, if it is desired to impart high lithium ion conductivity and electron conductivity to the intermediate layer 33, the intermediate layer 33 may contain an electrolyte or a conductive aid. Specifically, the intermediate layer 33 may contain hydrogen boride (HB), a solid electrolyte and a conductive aid. The conductive aid may be, for example, carbon. In addition, the solid electrolyte may be, for example, the inorganic solid electrolyte described above, particularly, a sulfide solid electrolyte.

As described above, the intermediate layer 33 may be provided as a coat layer on the surface of the negative electrode current collector 31. That is, the intermediate layer 33 may cover the surface of the negative electrode current collector 31. Particularly, when the intermediate layer 33 covers the entire surface of the negative electrode current collector 31, the metallic lithium 32 can be deposited more uniformly.

The thickness of the intermediate layer 33 is not particularly limited, and may be appropriately determined according to desired battery performance. For example, if the ion conductivity and electron conductivity of the intermediate layer 33 are determined to be insufficient, the intermediate layer 33 may be made thinner. In addition, when the intermediate layer 33 contains an electrolyte or a conductive aid to secure sufficient ion conductivity and electron conductivity, the intermediate layer 33 may be thick or thin. The thickness of the intermediate layer 33 may be, for example, 1 nm or more and 1 mm or less. The thickness may be 10 nm or more or 100 nm or more, and may be 500 μm or less or 100 μm or less.

1.6 Other Members

The secondary battery 100 may have at least the above configuration, and may include other members. The members described below are examples of other members that the secondary battery 100 may have.

1.6.1 Exterior Body

The secondary battery 100 may be a battery in which each of the above configurations is accommodated inside an exterior body. More specifically, a part excluding tabs, terminals, and the like for extracting power from the secondary battery 100 to the outside may be accommodated inside the exterior body. As the exterior body, any one known as an exterior body for a battery can be used. For example, a laminate film may be used as the exterior body. In addition, a plurality of secondary batteries 100 may be electrically connected and arbitrarily stacked to form an assembled battery. In this case, the assembled battery may be accommodated inside a known battery case.

1.6.2 Sealing Resin

In the secondary battery 100, each of the above configurations may be sealed with a resin. For example, at least a side surface (surface in the lamination direction) of each layer shown in FIG. 1 may be sealed with a resin. This makes it easier to prevent water from entering the interior of each layer. As the sealing resin, a known curable resin or thermoplastic resin may be used.

1.6.3 Restraining Member

The secondary battery 100 may or may not include a restraining member for restraining each of the above configurations in the thickness direction. When a restraining pressure is applied by the restraining member, the internal resistance of the battery is likely to be reduced. There is no particular limitation on the restraining pressure of the restraining member.

2. Negative Electrode Current Collector for Lithium Deposition Type Negative Electrode The technology of the present disclosure also includes an aspect of a negative electrode current collector for a lithium deposition type negative electrode. That is, in the negative electrode current collector for a lithium deposition type negative electrode of the present disclosure, at least a part of the surface is covered with a coating layer, and the coating layer contains hydrogen boride (HB). As described above, when the surface of the negative electrode current collector 31 is covered with a layer containing HB, local deposition and growth of the metallic lithium 32 can be inhibited. A method of covering the surface of the negative electrode current collector 31 with a coating layer is not particularly limited. For example, when a solution or slurry containing HB is applied to the surface of the negative electrode current collector 31 and dried, a coating layer may be formed on the surface of the negative electrode current collector 31. Alternatively, a sheet made of HB may be adhered or press-bonded to the surface of the negative electrode current collector 31.

3. Method of Producing Secondary Battery

The secondary battery 100 can be produced by, for example, as follows. That is, as shown in FIG. 3A-3C, a method of producing the secondary battery 100 according to one embodiment includes covering at least one surface of the surface of the negative electrode current collector 31 and the surface of the electrolyte layer 20 with a coating layer containing hydrogen boride (HB) (the intermediate layer 33) (FIG. 3A), obtaining a laminate 50 including the positive electrode 10, the electrolyte layer 20, the coating layer (the intermediate layer 33) and the negative electrode current collector 31 in that order using the negative electrode current collector 31 or the electrolyte layer 20 covered with the coating layer (the intermediate layer 33) (FIG. 3B), and performing charging on the laminate 50 and depositing the metallic lithium 32 between the electrolyte layer 20 and the negative electrode current collector 31 (FIG. 3C).

3.1 Covering

Figure 3A:
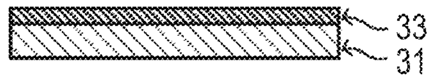
FIG. 3A schematically shows an example of a flow of a method of producing a secondary battery.
Figure 3B:
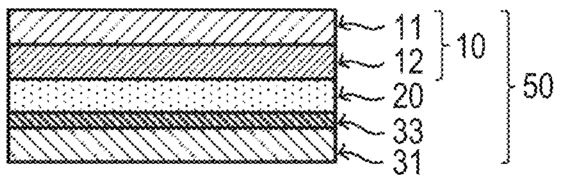
FIG. 3B schematically shows an example of a flow of a method of producing a secondary battery.
Figure 3C:
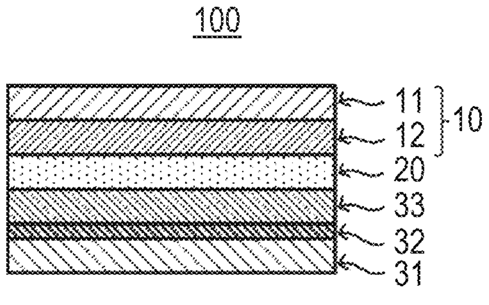
FIG. 3C schematically shows an example of a flow of a method of producing a secondary battery.

As shown in FIG. 3A, in the production method according to the present embodiment, at least one surface of the surface of the negative electrode current collector 31 and the surface of the electrolyte layer 20 is covered with a coating layer containing hydrogen boride (HB) (the intermediate layer 33). In consideration of excellent handling properties or the like, as shown in FIG. 3A, the surface of the negative electrode current collector 31 may be covered with the coating layer. A method of covering the surface of the negative electrode current collector 31 and the surface of the electrolyte layer 20 with a coating layer is not particularly limited. For example, as described above, a coating layer can be formed on the surface of the negative electrode current collector 31 and/or the surface of the electrolyte layer 20 by a coating method using a solution or slurry.

3.2 Preparation of Laminate

As shown in FIG. 3B, in the production method according to the present embodiment, the laminate 50 including the positive electrode 10, the electrolyte layer 20, the intermediate layer 33 and the negative electrode current collector 31 in that order is obtained using the negative electrode current collector 31 and/or the electrolyte layer 20 covered with the coating layer (the intermediate layer 33) as described above. For example, the laminate 50 is easily obtained by molding and laminating the materials by applying, transferring, adhering or press-bonding the above materials so that the positive electrode current collector 11, the positive electrode active material layer 12, the electrolyte layer 20, the intermediate layer 33 and the negative electrode current collector 31 described above are laminated in that order. The laminate 50 may include at least one of each of the positive electrode current collector 11, the positive electrode active material layer 12, the electrolyte layer 20, the intermediate layer 33 and the negative electrode current collector 31. That is, the laminate 50 may include at least lamination unit of the positive electrode current collector 11, the positive electrode active material layer 12, the electrolyte layer 20, the intermediate layer 33, and the negative electrode current collector 31 described above, and may include a plurality of lamination units. In this case, the plurality of lamination units may be electrically connected in series or parallel to each other or may not be electrically connected.

Before or after the laminate 50 is obtained, pressure may be applied to the layers or the laminate 50 in the thickness direction (lamination direction). For example, the layers constituting the laminate 50 may be integrated by pressing or gaps between the layers constituting the laminate 50 may be eliminated and the interfacial resistance may be reduced. The layers or the laminate 50 can be pressed by a known technique. For example, the layers or the laminate 50 can be pressed in the lamination direction by various pressing methods such as CIP, HIP, roll pressing, uniaxial pressing, and mold pressing. The magnitude of the pressure applied to the layers or the laminate 50 in the lamination direction may be appropriately determined according to desired battery performance. For example, when the layers or the laminate 50 contains a sulfide solid electrolyte, in order to plastically deform the sulfide solid electrolyte and easily perform the above integration and elimination of gaps, the pressure may be 100 MPa or more, 150 MPa or more, 200 MPa or more, 250 MPa or more, 300 MPa or more or 350 MPa or more. The pressurization time and pressurization temperature of the layers or the laminate 50 are not particularly limited.

3.3 Charging

As shown in FIG. 3C, in the production method according to the present embodiment, the laminate 50 obtained as described above is charged and the metallic lithium 32 is deposited between the electrolyte layer 20 and the negative electrode current collector 31. Specifically, when the laminate 50 is charged, lithium ions move from the positive electrode active material contained in the positive electrode active material layer 12 toward the negative electrode current collector 31 via the electrolyte layer 20, and the lithium ions receive electrons between the electrolyte layer 20 and the negative electrode current collector 31 and are deposited as the metallic lithium 32. Charging may be the first charging after the laminate 50 is prepared or may be second or subsequent charging. The laminate 50 may be charged by the same method as the method of charging a general battery. That is, charging may be performed by connecting an external power supply to the positive electrode current collector 11 and the negative electrode current collector 31 of the laminate 50.

3.4 Other Processes

The production method according to the present embodiment may include a general process for producing a secondary battery in addition to the above processes. For example, a process of accommodating the laminate 50 inside an exterior body such as a laminate film and a process of connecting a current collector tab to the laminate 50 may be used. Specifically, for example, while a current collection tab is connected to the current collectors 11 and 31 of the laminate 50 (a part of the current collectors 11 and 31 may be protruded and used as a tab), and the laminate 50 is then accommodated in a laminate film as an exterior body with the tab pulled out to the outside of the laminate film, the laminate film is sealed, and then the laminate 50 may be charged through the tab outside the laminate film.

4. Vehicle Having Secondary Battery

As described above, a secondary battery of the present disclosure can uniformly deposit metallic lithium between the electrolyte layer and the negative electrode current collector and has high the Coulomb efficiency. That is, the secondary battery of the present disclosure has excellent durability. Such a secondary battery can be suitably used, for example, in at least one vehicle selected from among hybrid electric vehicles (HEV), plug-in hybrid electric vehicles (PHEV) and battery electric vehicles (BEV). That is, the technology of the present disclosure includes an aspect of a vehicle having a secondary battery, wherein the secondary battery includes a positive electrode, an electrolyte layer, a negative electrode current collector, and metallic lithium as a negative electrode active material that is deposited between the electrolyte layer and the negative electrode current collector by charging, an intermediate layer is present between the electrolyte layer and the negative electrode current collector, and the intermediate layer contains hydrogen boride (HB). The details of the configuration of the secondary battery are as described above.

One embodiment of the technology of the present disclosure has been described above, but the technology of the present disclosure can be modified into embodiments other than the above embodiment without departing from the spirit and scope of the present disclosure. Hereinafter, the technology of the present disclosure will be described in more detail with reference to examples, but the technology of the present disclosure is not limited to the following examples.

1. Preparation of HB-Coated Current Collector

A SUS foil (thickness: 10 μm) was attached to a surface plate with ethanol to remove air bubbles. Five drops of a hydrogen boride acetonitrile solution were dropped on the SUS foil using a syringe and coating was uniformly performed using a doctor blade (gap: 25 μm). Natural drying was performed until the liquid disappeared, and thus a SUS current collector foil whose surface was covered with an HB layer (HB-coated current collector) was obtained.

2. Preparation of HB Mixture 30 mg of hydrogen boride, 60 mg of a solid electrolyte (SE, LiBr—LiI—$Li_2S$—$P_2S_5$), and 10 mg of a conductive aid (VGCF) were dispersed in dehydrated heptane using an ultrasonic homogenizer. Then, drying was performed at 100° C. for 1 hour to obtain an HB mixture.

3. Preparation of Evaluation Cell

A half cell was prepared using metallic lithium as a counter electrode.

3.1 Comparative Example 1

101.7 mg of a solid electrolyte (LiBr—LiI—$Li_2S$—$P_2S_5$) was put into a φ11.28 mm cylindrical cylinder and left for 1 minute while a pressing pressure of 6 ton was applied to prepare an electrolyte pellet. A metallic lithium foil (thickness: 150 μm) was placed on one surface of the electrolyte pellet and left for 1 minute while a pressing pressure of 1 ton was applied, and additionally, a SUS foil (φ11.28 mm) was placed on the other surface of the electrolyte pellet and restrained with a torque of 2 nm to obtain an evaluation cell.

3.2 Example 1

An evaluation cell was obtained in the same manner as in the comparative example except that the HB-coated current collector was used in place of the SUS foil. That is, in the evaluation cell according to Example 1, an intermediate layer made of HB was disposed between the electrolyte pellet and the SUS foil.

3.3 Example 2

A 101.7 mg of a solid electrolyte (LiBr—LiI—$Li_2S$—$P_2S_5$) was put into a φ11.28 mm cylindrical cylinder and left for 1 minute while a pressing pressure of 6 ton was applied to an electrolyte pellet. 5 mg of the HB mixture was placed on one surface of the electrolyte pellet and left for 1 minute while a pressing pressure of 6 ton was applied to obtain an electrolyte-HB mixture pellet. Then, a metallic lithium foil (thickness of 150 μm) was placed on the other surface of the electrolyte-HB mixture pellet and left for 1 minute while a pressing pressure of 1 ton was applied, and additionally, a SUS foil (φ11.28 mm) was placed on one surface of the electrolyte-HB mixture pellet and restrained with a torque of 2 nm to obtain an evaluation cell. That is, in the evaluation cell according to Example 2, an intermediate layer made of an HB mixture was disposed between the electrolyte pellet and the SUS foil.

3.4 Comparative Example 2

An evaluation cell was obtained in the same manner as in Example 2 except that a mixture of a solid electrolyte and a conductive aid (solid electrolyte:conductive aid=60:10 (mass ratio)) was used in place of the HB mixture.

4. Charging and Discharging Cycle Test

The prepared evaluation cell was soaked in a thermostatic chamber at 25° C. for 3 hours, and then connected to a charging and discharging test machine, and a cycle test was performed at +1 V to −1 V and 0.435 mA/cm$^2$ while the temperature was maintained. The Coulomb efficiency (ratio of the discharging capacity to the charging capacity) was calculated for each of the 1st cycle, the 2$^{nd}$ cycle and the 3$^{rd}$ cycle.

5. Evaluation Results

Table 1 shows the type of the intermediate layer between the solid electrolyte layer and the SUS foil and the results of the Coulomb efficiency for examples and comparative examples.

TABLE 1

| | Intermediate layer (coating layer) | Coulomb efficiency (%) First cycle | Second cycle | Third cycle |
|---|---|---|---|---|
| Comparative Example 1 | None | 98.0 | 97.5 | 97.4 |
| Example 1 | HB | 99.3 | 99.4 | 99.4 |
| Example 2 | HB/SE/VGCF | 98.3 | 98.6 | 98.9 |
| Comparative Example 2 | SE/VGCF | 89.4 | 97.0 | 92.1 |

As can be clearly understood from the results shown in Table 1, it was found that, when the intermediate layer between the electrolyte pellet and the SUS foil contained HB, the Coulomb efficiency significantly increased. Details are as follows.

(1) When metallic lithium was directly deposited on the surface of the SUS foil without an intermediate layer as in Comparative Example 1, energy impact was large, and the deposited metallic lithium tended to grow locally and rapidly. That is, metallic lithium was non-uniformly deposited, many voids and the like were formed, and the Coulomb efficiency decreased.

(2) On the other hand, as in Examples 1 and 2, when the intermediate layer containing HB was present between the electrolyte pellet and the SUS foil, it was considered that, when metallic lithium was deposited, some lithium ions were occluded (adsorbed) by HB and slowly deposited as metallic lithium, and local and rapid growth of metallic lithium was likely to be inhibited. In addition, when metallic lithium was dissolved (ionized), lithium occluded (adsorbed) by HB also returned to the counter electrode. That is, in the evaluation cells according to Examples 1 and 2, reversible deposition and dissolution of lithium were likely to occur, and the irreversible capacity was unlikely to occur. As a result of these, the Coulomb efficiency was thought to be improved.

(3) Here, as in Comparative Example 2, when an intermediate layer containing only a solid electrolyte and VGCF and containing no HB was used, it was difficult to improve the Coulomb efficiency. This was thought to be because specific effects of HB were not exhibited.

Here, in the above examples, a half cell using a metallic lithium foil as a counter electrode was prepared and evaluated, but when a secondary battery was actually constructed, a positive electrode suitable as a counter electrode may be used. In addition, in the above examples, a case in which a specific solid electrolyte was used as an electrolyte layer and a SUS foil was used as a negative electrode current collector was exemplified, but the type of the electrolyte and the type of the negative electrode current collector were not limited thereto.

Based on the above results, it can be said that a secondary battery including a positive electrode, an electrolyte layer, a negative electrode current collector, and metallic lithium as a negative electrode active material that is deposited between the electrolyte layer and the negative electrode current collector by charging, wherein an intermediate layer is present between the electrolyte layer and the negative electrode current collector, and the intermediate layer contains hydrogen boride (HB), has high Coulomb efficiency.

What is claimed is:

1. A secondary battery comprising a positive electrode, an electrolyte layer, a negative electrode current collector, and metallic lithium as a negative electrode active material that is deposited between the electrolyte layer and the negative electrode current collector by charging, wherein an intermediate layer is present between the electrolyte layer and the negative electrode current collector, and wherein the intermediate layer consists of hydrogen boride.

2. The secondary battery according to claim 1, wherein the intermediate layer covers the surface of the negative electrode current collector.

3. The secondary battery according to claim 1, wherein the electrolyte layer contains a sulfide solid electrolyte.

4. The secondary battery according to claim 1, wherein the negative electrode current collector contains stainless steel.

5. A secondary battery comprising a positive electrode, an electrolyte layer, a negative electrode current collector, and metallic lithium as a negative electrode active material that is deposited between the electrolyte layer and the negative electrode current collector by charging, wherein an intermediate layer is present between the electrolyte layer and the negative electrode current collector, and wherein the intermediate layer contains hydrogen boride, a solid electrolyte and carbon material, and the carbon material is selected from vapor grown carbon fibers, acetylene black, ketjen black, carbon nanotubes and carbon nanofibers.

6. The secondary battery according to claim 5, wherein the solid electrolyte is a sulfide solid electrolyte.

* * * * *